D. H. MARKMANN.
VELOCIPEDE HORSE.
APPLICATION FILED MAY 15, 1915.
1,177,717.
Patented Apr. 4, 1916.
2 SHEETS—SHEET 1.
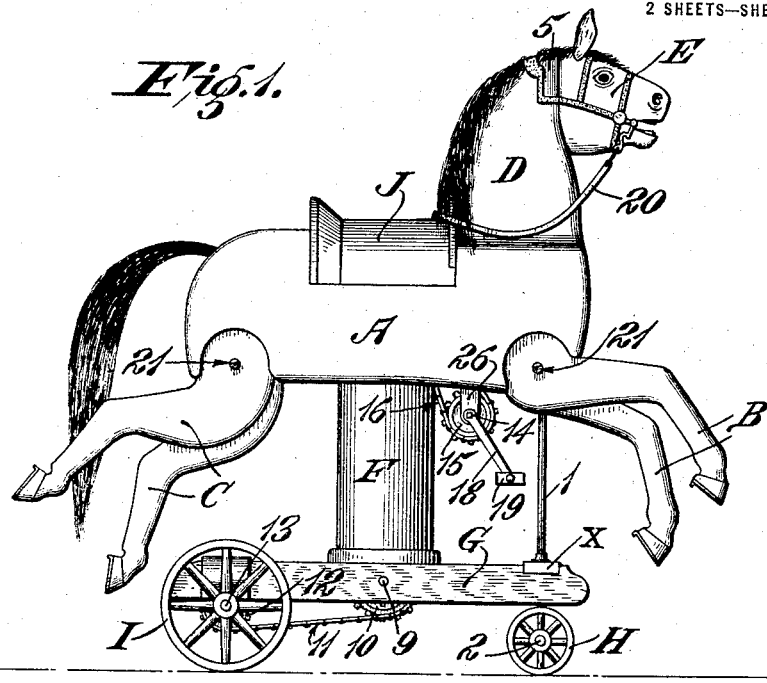
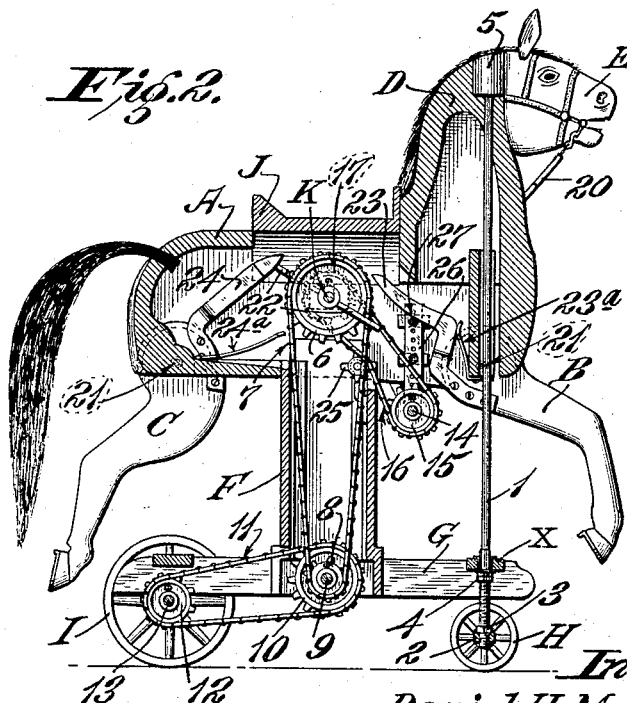
Inventor:
Daniel H. Markmann,
by Bakewell & Church
Attys.

D. H. MARKMANN.
VELOCIPEDE HORSE.
APPLICATION FILED MAY 15, 1915.
1,177,717.  Patented Apr. 4, 1916.
2 SHEETS—SHEET 2.
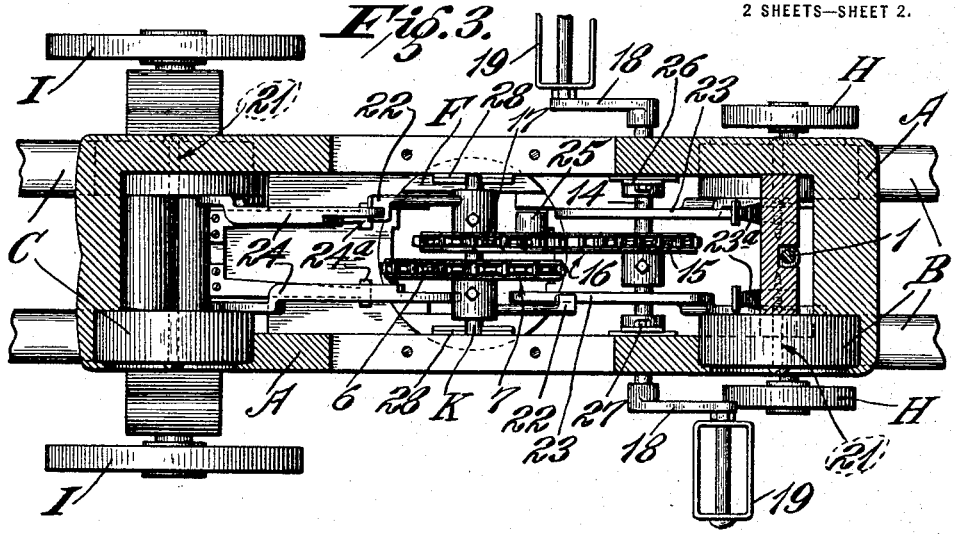
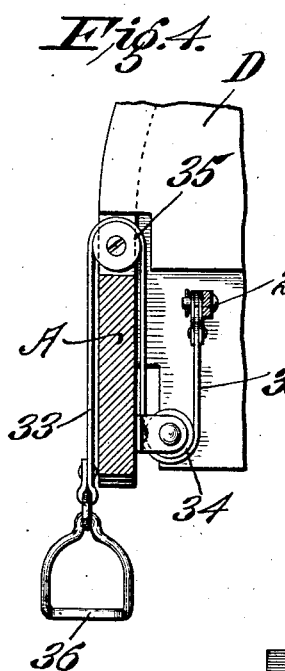
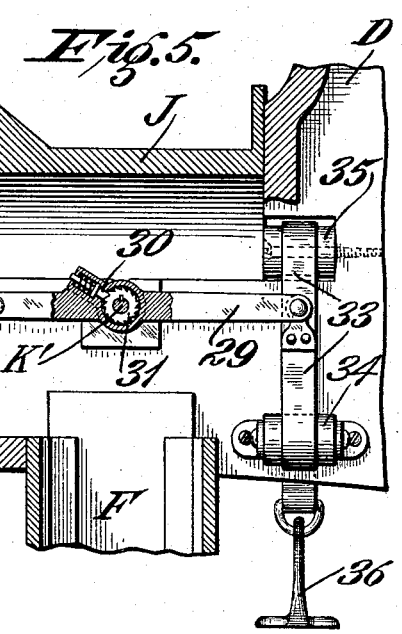
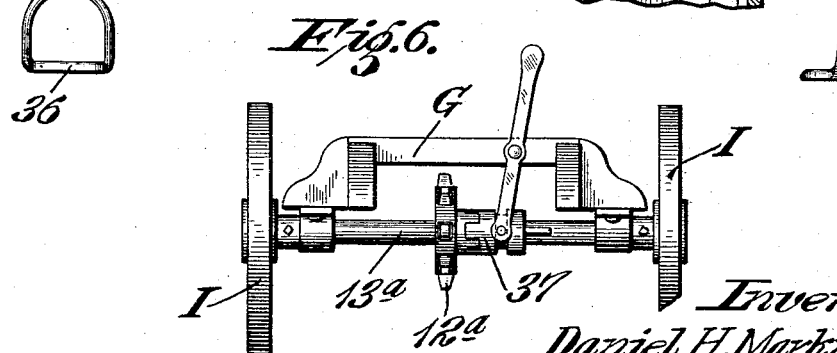
Inventor:
Daniel H. Markmann,
by Bakewell & Cornwell
attys.

UNITED STATES PATENT OFFICE.

DANIEL H. MARKMANN, OF ST. LOUIS, MISSOURI.

VELOCIPEDE-HORSE.

1,177,717.  Specification of Letters Patent.  Patented Apr. 4, 1916.

Application filed May 15, 1915.   Serial No. 28,341.

*To all whom it may concern:*

Be it known that I, DANIEL H. MARKMANN, a citizen of the United States, residing at St. Louis, Missouri, have invented a certain new and useful Improvement in Velocipede-Horses, of which the following is a full, clear, and exact description, such as will enable others skilled in the art to which it appertains to make and use the same.

This invention relates to velocipedes and particularly to velocipedes of the type that consists of a toy horse provided with wheels and a propelling mechanism that is adapted to be operated by the rider on the horse.

The main object of my invention is to provide a strong and substantial velocipede horse of novel construction that presents a life-like appearance when it is in motion.

Another object is to provide a velocipede horse that can be manufactured cheaply and which is so constructed that the movable legs on the body of the horse are not positively connected with the propelling mechanism that operates the traction wheels. And still another object is to provide a velocipede horse that consists of a truck provided with traction wheels, a pedestal on said truck, a toy horse mounted on said pedestal and provided with movable legs, and mechanism arranged inside of the body of the horse and inside of said pedestal for propelling the traction wheels and for causing the legs of the horse to move when the truck is in motion.

Other objects and desirable features of my invention will be hereinafter pointed out.

Figure 1 of the drawings is a side elevational view of a velocipede horse constructed in accordance with my invention. Fig. 2 is a vertical, longitudinal-sectional view of said horse. Fig. 3 is a longitudinal, horizontal-sectional view. Fig. 4 is a detail vertical, cross-sectional view, illustrating a slight modification of my invention. Fig. 5 is a vertical, longitudinal-sectional view, illustrating the modification shown in Fig. 4; and Fig. 6 is an end view, illustrating a detail of the modification shown in Figs. 4 and 5.

Referring to Figs. 1 to 3 of the drawings, which illustrate the preferred form of my invention, A designates the body of my improved velocipede horse which is provided with front legs B, rear legs C, neck D and head E. The front and rear legs are pivotally mounted so that they move when the horse is in motion, and thus give the impression that the horse is running, and the head E is mounted in such a manner that it can be turned horizontally to the right and left. The horse is mounted on a pedestal F carried by a truck G provided with front and rear wheels H and I, respectively, the body portion A of the horse and the pedestal F being hollow, as shown in Fig. 2, so as to inclose most of the mechanism employed to propel the horse. A saddle J, on which the rider rests, is preferably removably mounted on the body portion A so as to provide access to the interior of the body portion and the mechanism arranged inside of same. In the embodiment of my invention herein shown the head E is rigidly connected to a vertically-disposed steering shaft 1 whose lower end is connected to the front axle 2 on which the wheels H are mounted, said shaft passing through a cross piece $x$ on the truck G and provided with an externally screw-threaded portion, as shown in Fig. 2, that passes through the axle 2. A lock nut 3 is arranged on the shaft 1 above the axle 2, so as to securely lock said parts together, and a nut 4 is mounted on the screw-threaded portion of said shaft underneath the cross piece $x$ of the truck so as to form an adjustable stop on said shaft that supports the weight of the truck G and the parts carried by same. It is immaterial how the head E is combined with the neck D, but I prefer to form a cylindrical-shaped portion 5 on the head, as shown in Fig. 2, that fits snugly in a socket or seat in the neck D.

The horse is provided with a manually-operated propelling means which can be constructed in various ways, so long as it is of such a design that it can be actuated by the rider to impart movement to the truck G, and thus cause the horse to travel or move from place to place.

In the form of my invention shown in Figs. 1, 2 and 3 the propelling mechanism consists of a driving shaft K provided with a sprocket wheel 6 that coöperates with a sprocket chain 7 that extends around a sprocket wheel 8 on a countershaft 9. Said countershaft 9 is provided with a sprocket wheel 10 that drives a sprocket chain 11 which extends around a sprocket wheel 12 secured to the rear axle 13, to which the wheels I are originally connected, said rear axle being journaled in bearings on the truck G.

The drive shaft K is operated by means of a crank shaft 14, a sprocket wheel 15 on said crank shaft, and a sprocket chain 16 that leads from the sprocket wheel 15 to a sprocket wheel 17 on the drive shaft K, said crank shaft 14 being provided with cranks 18 that are equipped with pedals 19. The cranks 18 are so arranged with relation to the saddle J that the feet of the rider can be placed upon the pedals 19 so as to rotate the crank shaft 14, and thus transmit rotary movement to the drive shaft K and to the mechanism interposed between said drive shaft and the rear axle to which the traction wheels I are connected, thereby causing the truck G to move forwardly or rearwardly, depending upon the direction of rotation of the crank shaft 14. By turning the head of the horse in one direction or another the truck G can be guided accurately, owing to the fact that the head is connected to the steering shaft 1, which, in turn, is rigidly connected to the front axle 2 on which the guiding wheels H are mounted, the position of the head E being governed by lines or reins 20 that lead from the head E back to the saddle J, as shown in Fig. 1.

The front and rear legs are pivotally connected to the body portion A by means of pintle pins 21, and means is employed for causing said legs to rise and fall when the truck G is in motion, the means herein illustrated for this purpose consisting of arms 22 carried by the drive shaft K that coöperate with arms 23 on the front legs B and with arms 24 on the rear legs C when the drive shaft K rotates. The drive shaft K is equipped with two arms 22, one of which coöperates with the right front and rear legs and the other coöperating with the left front and rear legs.

The front and rear legs are counterweighted or constructed in such a manner that when said legs are in their normal or idle positions, that is, when the extensions 23 and 24 are not engaged by the arms 22 on the drive shaft K, said extensions will lie against leaf springs 23ᵃ and 24ᵃ secured to the body portion of the horse. When the drive shaft K is rotated either forwardly or rearwardly, the arms 22 thereon will engage the extensions 23 and 24 and cause the legs to oscillate about their pintle pins 21, and when the rotating arms 22 have passed by the extensions 23 and 24 said extensions will return by gravity to their normal positions, striking the springs 23ᵃ and 24ᵃ which act as buffers to prevent noise and shock that would occur if the extensions were allowed to strike directly against the body portion A.

In the embodiment of my invention herein shown the mechanism for actuating the legs or causing them to rock on their pintle pins is so constructed that the right and left front legs will operate alternately and the right and left rear legs will also operate alternately.

The sprocket chain 16 that extends from the crank shaft 14 to the drive shaft K preferably passes over an idler 25, as shown in Fig. 2, which tends to keep said chain tight, and the crank shaft 14 is preferably journaled in adjustable bearings 26 mounted on the inside of the body portion A, as shown in Fig. 2, and depending from the underside of said body portion, as shown in Fig. 1. One convenient way of forming the hangers or adjustable bearings 26 is to provide each of said bearings with a plurality of holes, as shown in Fig. 2, that receive bolts 27 carried by plates arranged on the inside of the body portion of the horse. In order that the operating mechanism may be removed easily, I have mounted the drive shaft K in slotted bearings 28 arranged on the inside of the body portion A as shown in Fig. 3, said bearings being so designed that the drive shaft can be lifted upwardly out of same.

Instead of operating the drive shaft K by means of a crank shaft and sprocket chain, as shown in Figs. 1, 2 and 3, said drive shaft can be operated by a pawl and ratchet mechanism. In Figs. 4 and 5 I have illustrated a propelling mechanism of this character that comprises a rock lever 29 which is provided with a spring-pressed pawl 30 that coöperates with a ratchet wheel 31 on the drive shaft K′, said drive shaft being connected with the traction wheels I in the manner shown in Figs. 1 to 3, or in any other suitable way. The rock arm 29 is under the influence of a spring or springs which restore it to its normal position after it has been actuated by the manually-operated means employed for this purpose. In the mechanism shown in Figs. 4 and 5 a coiled spring 32 is connected to one end of the rock arm 29 and two flexible actuating devices 33 are connected to the opposite end of said rock arm. The rock arm 29 is located inside of the body of the horse at approximately the longitudinal center of same, and the flexible actuating devices 33 lead from said rock arm around pulleys 34 and 35 to stirrups 36, the pulleys 34 and 35 being mounted on the body portion A of the horse and the flexible actuating devices 33 being so arranged that the rock arm 29 will be moved upwardly and downwardly when the rider depresses the stirrups 36 that are connected to the free ends of the actuating devices 33.

In view of the fact that an operating mechanism of the construction illustrated in Figs. 4 and 5 will move the horse in only one direction, namely, forwardly, I have provided the rear axle 13ª with a clutch 37, as shown in Fig. 6, for connecting the sprocket wheel 12ª with the rear axle and disconnecting it therefrom. If it is desired to move the horse rearwardly, the clutch 37 is actuated so as to disconnect the sprocket wheel 12ª from the rear axle, and thus enable the truck G to be moved rearwardly while the propelling mechanism remains at rest.

A velocipede horse of the construction above described not only forms an amusing toy for a child, but it is also exceedingly useful, in view of the fact that it tends to build up the muscles in the legs of the child operating the horse. Furthermore, it gives the impression of actually riding a horse, as it is mounted on wheels and comprises means for propelling the wheels so as to move the horse and its rider from place to place. The direction of travel of the horse can be controlled accurately by the rider, by simply turning the horse's head in the direction in which it is desired to have the horse travel, and when the horse is in motion, its legs move upwardly and downwardly, thus giving the impression that the horse is running. The horse presents a life-like appearance, as most of the propelling mechanism is hidden from view; and still another desirable feature of such a horse is that it can be manufactured at a low cost on account of the simplicity of the propelling mechanism.

While I have herein illustrated the horse mounted on a truck whose rear wheels act as traction wheels and whose front wheels can be turned so as to change the direction in which the horse travels, I do not wish it to be understood that my broad idea is limited to a velocipede horse constructed in this exact manner.

Having thus described my invention, what I claim, and desire to secure by Letters Patent, is:

1. A velocipede horse provided with a manually-operated propelling mechanism for causing the horse with its rider to move, rigid legs pivotally mounted on the body portion of the horse and having no direct connection with each other, extensions on the inner ends of the legs, means carried by said propelling mechanism that strikes against said extensions and moves said legs in one direction when the horse is in motion, and springs coöperating with the extensions on the legs for limiting the degree of movement of said legs.

2. A velocipede horse comprising a hollow body portion, a truck provided with supporting wheels or rollers, a hollow pedestal on said truck which carries said body portion, a propelling mechanism, most of whose elements are arranged inside of said pedestal and hollow body portion, rigid legs pivotally mounted on said body portion having no direct connection with each other, said legs being so arranged that they are free to swing upwardly and downwardly, and devices on the inner ends of said legs that are struck by coöperating devices on the propelling mechanism when the horse is in motion.

3. A velocipede horse comprising a body portion provided with pivotally mounted rigid legs that have no direct connection with each other, a truck provided with wheels or rollers, a pedestal on said truck that carries said body portion, a sprocket chain and sprocket wheels for driving the rear wheels of the truck, rotating devices that strike against extensions on the inner ends of said legs and oscillate said legs, and a manually-operated mechanism arranged in said body portion and pedestal for driving said sprocket chain, and said rotating devices.

4. A velocipede horse comprising a body portion, a propelling mechanism comprising a drive shaft mounted in bearings in said body portion, means adapted to be actuated by the rider for operating said drive shaft, pivotally mounted legs on the body portion provided with arms, and devices operated by the drive shaft that strike against said arms and thus impart movement to said legs when the drive shaft is in operation.

In testimony whereof I hereunto affix my signature in the presence of two witnesses, this thirteenth day of May, 1915.

DANIEL H. MARKMANN.

Witnesses:
WELLS L. CHURCH,
GEORGE BAKEWELL.

Copies of this patent may be obtained for five cents each, by addressing the "Commissioner of Patents, Washington, D. C."

It is hereby certified that in Letters Patent No. 1,177,717, granted April 4, 1916, upon the application of Daniel H. Markmann, of St. Louis, Missouri, for an improvement in "Velocipede-Horses," errors appear in the printed specification requiring correction as follows: Page 2, line 1, for the word "originally" read *rigidly;* page 3, line 86, claim 3, after the word "chain" strike out the comma; and that the said Letters Patent should be read with these corrections therein that the same may conform to the record of the case in the Patent Office.

Signed and sealed this 25th day of April, A. D., 1916.

[SEAL.]

Cl. 208—42.

J. T. NEWTON,
*Acting Commissioner of Patents.*